United States Patent [19]
Paddock

[11] Patent Number: 6,079,368
[45] Date of Patent: Jun. 27, 2000

[54] ANIMAL GROOMING RESTRAINT

[76] Inventor: David Paddock, 760 W. 16th St., Building I, Costa Mesa, Calif. 92627

[21] Appl. No.: 09/217,492

[22] Filed: Dec. 21, 1998

[51] Int. Cl.[7] .................................................. A01K 15/04
[52] U.S. Cl. ............................ 119/756; 119/792; 482/38; 482/39; 482/40
[58] Field of Search .................................... 119/158, 751, 119/752, 754, 755, 756, 757, 771, 784, 792; 482/38, 39, 40; 224/313, 550, 551

[56] References Cited

U.S. PATENT DOCUMENTS

| | | | |
|---|---|---|---|
| 2,438,979 | 4/1948 | Short | 119/751 |
| 3,266,464 | 8/1966 | Davis | 119/756 |
| 4,316,433 | 2/1982 | Hebert | 119/673 |
| 4,899,694 | 2/1990 | Belluomini | 119/771 |
| 4,970,991 | 11/1990 | Luce | 119/660 |
| 5,178,098 | 1/1993 | Samberg | 119/756 |
| 5,269,260 | 12/1993 | Farrell et al. | 119/676 |

FOREIGN PATENT DOCUMENTS 46104  4/1961  Canada ..................................... 482/39

*Primary Examiner*—Peter M. Poon
*Assistant Examiner*—Judith A. Nelson
*Attorney, Agent, or Firm*—Pendorf & Cutliff

[57] ABSTRACT

A rod-shaped animal restraining device, the length of which is adjustable to fit securely under tension between two vertical walls such as the walls of a bathtub or shower stall, the rod shaped restraining device including an attachment for easy securement of an animal to the rod. Adjustment of the length of the rod-shaped device is preferably accomplished by providing a lever activated length adjustment device, such that pivoting of a lever changes the overall length of the rod-shaped device. The device is simple, lightweight, made of non-corrosive materials, and can be quickly and easily installed between two opposing vertical walls. The device thus enables pet owners to securely restrain their pets while the animals are being bathed indoors.

7 Claims, 7 Drawing Sheets

ANIMAL GROOMING RESTRAINT

BACKGROUND OF THE INVENTION

1. Field of the Invention

The present invention is directed to an animal restraining device which can be secured between two vertical surfaces, such as the walls of a bathtub or shower stall, and to which an animal such as a dog can be attached so as to restrain the animal during washing of the animal.

2. Description of the Related Art

The animal supply and service industries are very lucrative and very competitive. These industries provide the public with animal groomers, veterinarians, special foods available for animals with special diets, and a variety of devices that aid in the care of the animal. The existence of such industries provides evidence of the public's desire to care for animals in the most efficient, convenient, inexpensive, and humane way possible.

Bathing animals is part of the routine care of the animals. It protects both the public and the animals from health hazards and keeps the animals clean and presentable. However, bathing an animal can be a difficult procedure. Often times, the animal will resist being bathed. When the animal is not completely restrained, it will move about as much as possible, making bathing difficult and creating a mess as water and soapsuds are splashed about. For example, when bathing an animal in a bathtub, the animal is usually held with one hand and washed with the other hand. A bathtub generally has flat surfaces with no convenient points for securing an animal such that the animal would be restrained in a convenient position for bathing. The hassle in bathing animals has undoubtedly caused many perspective pet owners to decide not to purchase pets.

Some pet owners have dealt with the difficulties associated with bathing animals by taking the animal to a groomer. However, an animal's anxiety is enhanced where the animal is being bathed in an unfamiliar environment and by an unfamiliar animal groomer. This anxiety translates to restlessness of the animal, which creates difficulty for the animal groomer. Further, professional bathing of animals can be costly and, therefore, may not be a viable alternative for all pet owners. Also, often times it is inconvenient for a pet owner to have to schedule an appointment in order to have their pet bathed, and then to deliver and retrieve the animal.

Other pet owners have dealt with the difficulties associated with bathing animals by using an outdoor animal restraining device such as that taught in U.S. Pat. No. 5,353,747 (Fain) and numerous other patents to restrain the animal while bathing them outdoors. These patents teach a device that must be driven into the ground in order to be utilized. However, the device cannot be used for bathing an animal in inclement weather. The animal can become ill as a result of being bathed outdoors in weather that is either too hot or too cold. The animal can become dirty rather quickly if washed on a lawn. Furthermore, the requirement that the devices be driven into the ground makes them useless to pet owners who do not have lawns and outdoor running water. Therefore, the outdoor animal restraining device is not a viable alternative to many pet owners.

Given the public need and desire to bathe animals, it is the object of the present invention to provide an efficient, convenient, affordable, and humane way by which animals can be restrained indoors for bathing.

SUMMARY OF THE INVENTION

In view of the foregoing disadvantages inherent in known types of animal restraint devices that can be used during the bathing of animals, it is the object of the present invention to provide a device with which pet owners can restrain their animals indoors during bathing. It is a further object to provide a device which is lightweight, compact, simple to understand and use, and which can securely restrain even large animals in a space between vertical surfaces, such as in a bathtub or shower stall.

These and other objects are accomplished by providing a generally rod-shaped securing device, the length of which is adjustable to facilitate wedging horizontally tightly and securely between two vertical walls, the rod shaped device including attachment means such as a clip or carabiener for easy attachment of an animal to the rod. The device functions as a sturdy temporary beam which can be easily installed and removed. The term "rod-shaped" is used loosely and is intended ton include any elongate shape which can span horizontally from one wall of a bathtub or shower stall to the other wall, without getting in the way, such as a horizontal column or pillar shape or even a bone shape. The adjustment of the length of the rod-shaped device is preferably accomplished by providing the rod-shaped device in two pieces, the first piece having external helical threading, the second piece having internal helical threading adapted to receiving the external helical threading of the first piece, such that rotation (screwing) of the first piece relative to the second piece changes the overall length of the rod-shaped device.

The device is simple, lightweight, made of non-corrosive materials, and can be quickly and easily installed between opposing vertical walls such as the walls of a bathtub or shower. The device thus enables pet owners to securely restrain their pets while the animals are being bathed indoors. Aware that their range of movement is very restricted, the animals do not attempt to move about or struggle, but rather remain stationary and calm.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other animal restraint devices for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

After extensive investigation, the present inventor has discovered that an animal can be easily restrained between relatively flat opposing vertical walls, even those which provide no apparent attachment fixtures for attachment of animals such as the walls of a bathtub or shower stall, by means of a device which is preferably generally cylindrical in shape (e.g., column shaped, pillar shaped, dog bone shaped), which has outer ends provided with a skid resistant material, and of which the overall length of the device can be adjusted so as to secure the device between the vertical surfaces under tension.

In a preferred embodiment of the invention, the length is adjusted by providing the rod assembly in two parts with a first rod part and a second rod part, each rod part having an outward end and an inward end. Each outward end is provided with a skid resistant material for frictional engagement with a vertical wall. At least one of the skid resistant materials may be rotatably mounted on the outward end of the rod part, so that the skid resistant material can frictionally contact the vertical surface without rotation while the rod piece to which it is connected is rotated to develop tension.

In this preferred embodiment, the first rod part has an inward end provided with external threading, the second rod part has an inward end provided with internal threading dimensioned for engagement with the external threading of the first rod part, such that when the first part is screwed into the second part, rotation of the first rod part about its axis relative to the second rod part axis causes either a lengthening or a shortening of the length of the rod-shaped device.

Figure 4:
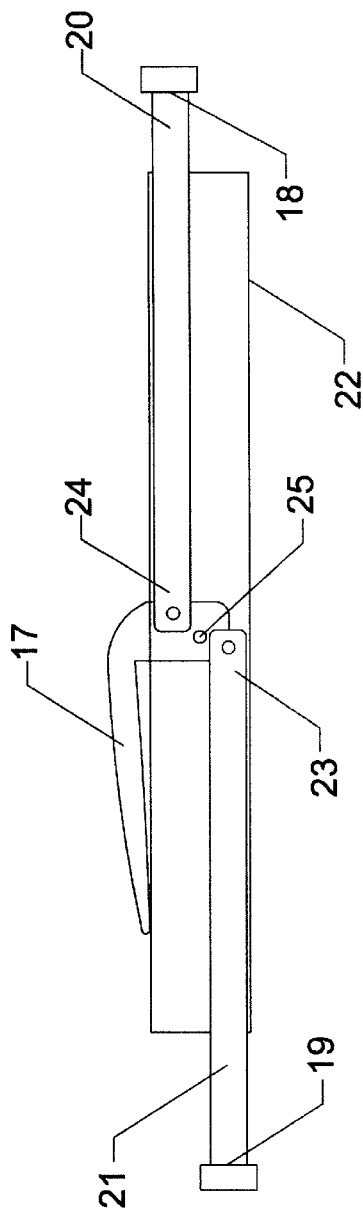
FIG. 4 is a cross-sectional view of a lever-activated device according to the invention in the extended, installed condition.
Figure 5:
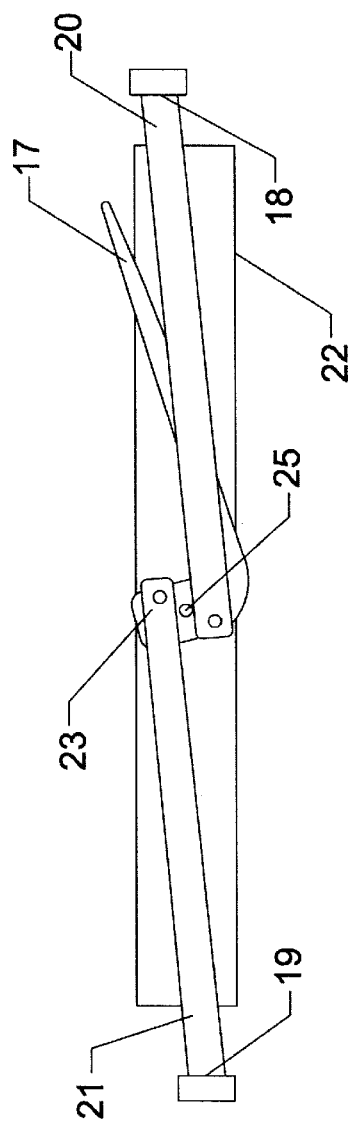
FIG. 5 is a cross-sectional view of a lever-activated device according to the invention in the retracted, non-installed condition.

Of course, other means for changing the length of the rod for tensionally securing are within the contemplation of the inventor. For example, as depicted in FIGS. 4 and 5, lever means may be used wherein rod segments 20, 21 are slidably mounted within a cylindrical housing 22, with inner ends 23, 24 of the rod segments are attached eccentrically to a lever 17, which is pivotally mounted to a pivot pin 25, the pivot pin fixed to the cylindrical housing 22, such that when the lever is in a first "unlocked" position, as shown in FIG. 5, the rod segments are both retracted, and when the lever is in a second or "locked" position, as shown in FIG. 4, the rod segments are in an extended position with rod outer ends 18, 19 urged against the walls of the bathtub or shower.

The operation of the animal securing device will now be explained in greater detail using a bathtub as the exemplary installation site. The length of the device is first adjusted by rotating one rod piece about its axis relative to the other piece so that the device just fits between the vertical walls where it is to be installed, e.g., the walls of a bathtub. The device is then held in place with one hand while the other hand rotates one rod piece relative to the other, stationary rod piece to cause the rodshaped device to become distended. As the outer skid-resistant surfaces are forced against the walls of the bathtub under pressure, the rod-shaped device becomes securely yet releasably mounted within the bathtub, incapable of being dislodged even by a strong animal.

A preferred securing device according to the invention will now be discussed in greater detail by reference to the drawings.

Figure 1:
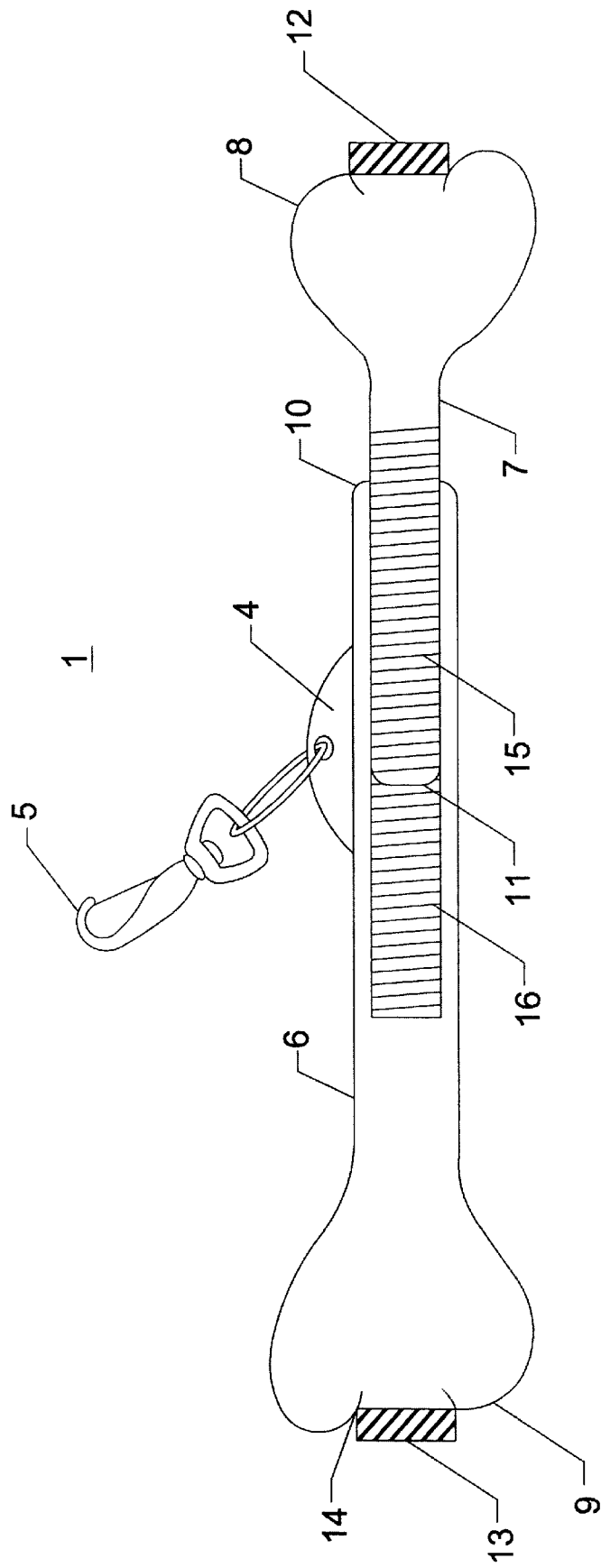
FIG. 1 is a cross-sectional view of a first embodiment of an animal restraining device.
Figure 2:
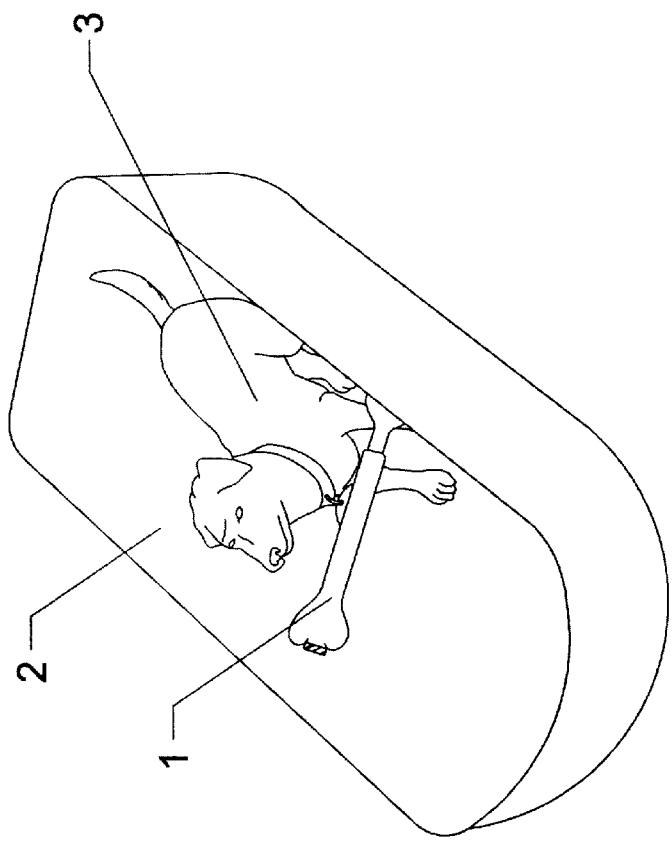
FIG. 2 is a top view of the animal restraining device, installed in a bathtub, and restraining a dog.
Figure 3:
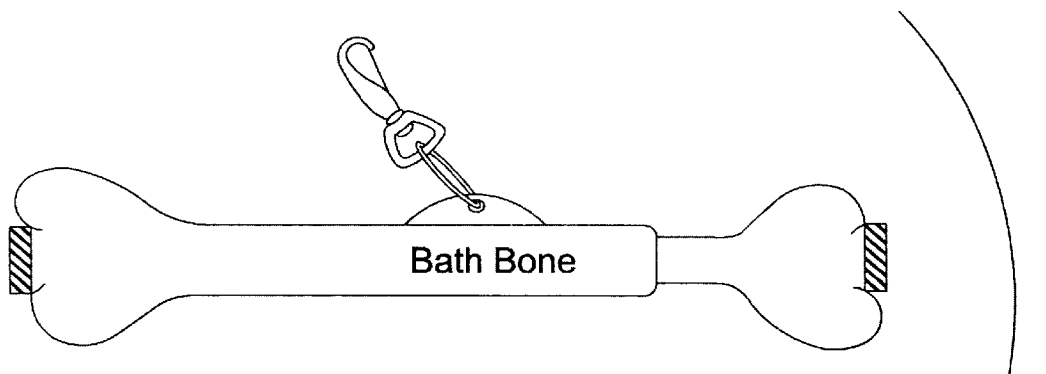
FIG. 3 is a cross-sectional view showing the two separate rod pieces of the restraining device.
Figure 3A:
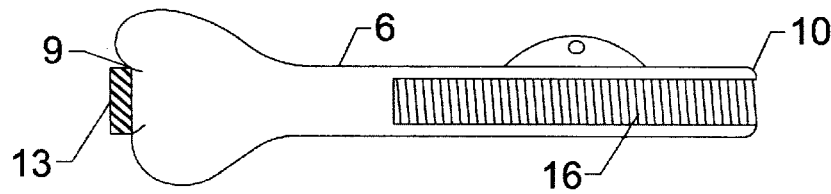
Figure 3B:
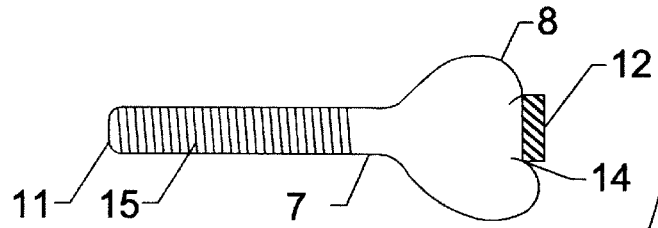

There is shown, in FIGS. 1 and 2, a distensible rod assembly 1 which can be secured between two supports, such as the sides of a bathtub 2 or the walls of a shower. Following securing of the distensible rod assembly 1 between the sides of a bathtub 2 or the walls of a shower, an animal 3 can be restrained by attaching the animal at its collar to a latching device 5 which is attached to a U-shaped extension 4 provided centrally on the securing rod assembly. An animal such as a dog will shake beginning with his head and progress down his body to his tail. By attaching the animal at the collar, or neck, to the secured rod assembly, the animal's neck is restrained against movement, the animal is prevented from beginning the head shaking, and, thus, the splashing of soap and water, is attenuated. A benefit of the specific configuration of the device is that the animal quickly recognizes that its range of movement is very limited, and understanding this, the animal no longer attempts to escape.

As depicted in FIG. 1, in its preferred embodiment, the distensible rod assembly 1 is comprised of two rod parts with a first rod part 6 and a second rod part 7, the two rod parts together forming the shape generally referred to as a dog-bone. Each rod part has an outward end 8,9 and an inward end 10, 11. Each outward end 8,9 is provided with a skid resistant material pad 12, 13 for frictional engagement with a vertical wall. At least one of the skid resistant material pads may be mounted on rotating means 14 such as ball bearings, roller bearings, slip disks, etc., at the outward end 8 of a rod part 7, so that the skid resistant material pad 12 can frictionally contact the vertical surface without rotation while the rod piece 7 to which it is connected via rotatable means 14 is rotated to distend the device and to develop tension for securing the device to the bathtub walls.

In this preferred embodiment, the first rod part 7 has an inward end 11 provided with external threading 15, the second rod part 6 has an inward end 10 provided with an axial bore provided internal threading 16 dimensioned for engagement with the external threading 15 of the first rod part 7, such that when the external threading of the first part is screwed into the internal threading of the second part with engagement of the threads, rotation of the first rod part 7 about its axis relative to the second rod part 6 axis causes either a lengthening or a shortening of the overall length of the rod-shaped securing device, depending upon the direction of rotation.

The ability of the distensible rod assembly to restrain an animal is derived from the ability of the rod to store tension and keep the skid resistant pads 12, 13 pressed against the walls of the bathtub 2, or the walls of a shower stall. The skid resistant pads 12, 13 may be made of rubber, natural or synthetic sponge-like material, plastic, or some other suitable material selected so as not to damage the walls of a bathtub. All that is necessary is that the pads be difficult to dislodge when held in place under considerable pressure developed by torquing the securing rod assembly. The skid resistant pads may even be designed as suction cups, but this is less preferred since it may be difficult to dislodge suction cups from bathtub walls. The size of the skid resistant pads may be is selected depending upon the material, different materials having a different coefficient of friction, and the force which the securing device is designed to exert on the pads.

Lengths, thicknesses and threading of first and second rod parts are easily selected depending upon the dimensions of the space to be spanned, the strength of the animal, and the characteristics of the material of which the restraining device is constructed. In a preferred embodiment, the dimensions are as follows:

When fully extended, the device is from 22 to 26 inches in length, preferably about 26 inches in length. When fully collapsed or retracted, the device is from 16 to 22 inches in length, preferably about 20 inches in length. One of the rods is preferably about 1 and ¾ inches in diameter, and the other of the rods is preferably about 1 and ¼ inches in diameter. The threading is approximately 6 to 16 threads per inch, preferably 8 to 12 threads per inch, most preferably about 10 threads per inch.

The force exerted by the rod parts on the pads, and thus by the pads on the bathtub walls, is adjusted by rotating the first rod part 7 relative to the second rod part 6. The skid resistant material is selected so as to prevent damage to the sides of the bathtub or to the walls of the shower upon installation of the securing device. The number of threads 15, 16 per inch is selected so that the friction of the first and second rod parts against each other in the threaded contact area is sufficient to prevent rotation and loosening of the device during use. The greater the number of threads per inch, the less likely that axial rotation of the first rod part relative to the second rod part will occur. That is, if the number of threads per inch is too small, the device will easily rotate by itself during the washing of the animal and come loose. However, if the threading is selected to be too fine, i.e., too many threads per inch, many revolutions will be needed to secure the device, and further, it may be possible to over-torque the device and either damage the device or the bathtub in which the device is being secured.

The material of which the anchoring device is constructed must be selected so as to be sufficiently strong and resistant to bending. Slippage of the device due to bowing of the anchoring device is prevented by using a sufficiently strong polymer, such as polyurethane, high density polyethylene, a fiber-reinforced polymer such as a fiber reinforced acrylonitrile-butadiene-styrene polymer, or nylon. Using a polymer, which is not prone to rusting due to water exposure, in constructing the rod shaped assembly also allows the device to be used for bathing animals without worry of water damage of the assembly.

The ability of the assembly to restrain an animal is also derived from its ability to resist pulling forces of the animal being restrained. The strength of the securing rod assembly can be altered by varying a number of the design specifications of the assembly. The type of polymer used in constructing the assembly can be varied, the outer diameters of the rod shaped parts 6, 7 can be varied, and the bored out inner diameter 11 of second rod part 6 and the outer diameter of the externally threaded 15 inward end of the first rod part 7 can be varied, the number of threads per square inch can be varied, and the amount of projected overlap between the first and second rod shaped parts can be varied. In this way, a rod assembly strength necessary to withstand breakage by even larger animals can be attained.

Turning to the means for attaching the animal to the rod shaped device, this means is not limited in any way and any means which will result in the animal being attached to the rod-shaped device can be used. The attachment means ultimately selected will be selected based upon criteria such as convenience of the manner for attachment, resistance to breakage and corrosion, low cost, lack of sharp edges, attractive appearance, etc. In its preferred embodiment, the animal is attached to the securing rod assembly at the collar via a latching device that is attached to the telescoping rod assembly at a U-shaped extension 4 located centrally on the securing rod assembly. Alternatively, a hole can be drilled through rod piece 7 and an attachment means such as a large cotter pin, a "D"-clip, or an open-eye screw can be introduced into the hole. Another variation of attaching the latching device to the rod assembly involves setting the latching device into the rod assembly molding as the assembly is being constructed, i.e., before the polymerizable resin has hardened. These variations may affect the difficulty with which the animal can break the latching device from the rod assembly.

The type of latching device can also be varied to offer the strongest and most convenient way of latching the animal at the collar, or neck, to the telescoping rod assembly. Various clips, carabiniers, and rings can be utilized to latch the animal to the telescopic rod assembly.

Also, because the device will be used residentially as well as commercially, the securing rod assembly can be made aesthetically pleasing. Because the rod assembly will be constructed of a polymer, the device can be made transparent or offered in a variety of colors so that it can more easily blend with the decorum of the room in which it is used. A company logo can also be printed on the device for advertising purposes.

Therefore, the device will not only serve the function of allowing pet owners to more easily bathe their pets, an important part of the routine care of the animal, but it will do so in an affordable, convenient, and humane way. In addition, the present invention could be produced in a variety of sizes, strengths, and colors to adapt it to any size animal and the preference of the consumer. In today's busy culture, pet owners often do not have the time or money to properly care for animals. The present invention eliminates the need of the owner to expend excessive amounts of time or money to properly care for an animal. As a result, there will be fewer issues that perspective pet owners need concern themselves with when assessing the possibility of purchasing a pet.

The device is also useful for restraining an animal during grooming or brushing. Also, the device can be used to hold the animal during dipping in a flea or tick bath, so that the animal is prevented from shaking or splashing poisons. In the case that it is desired to use the animal restraining device in space which is wider than a bathtub, e.g., a doorway, the animal restraining device can be extended by introducing an extender piece 35 between the two rod pieces 6 and 7.

Figure 6:
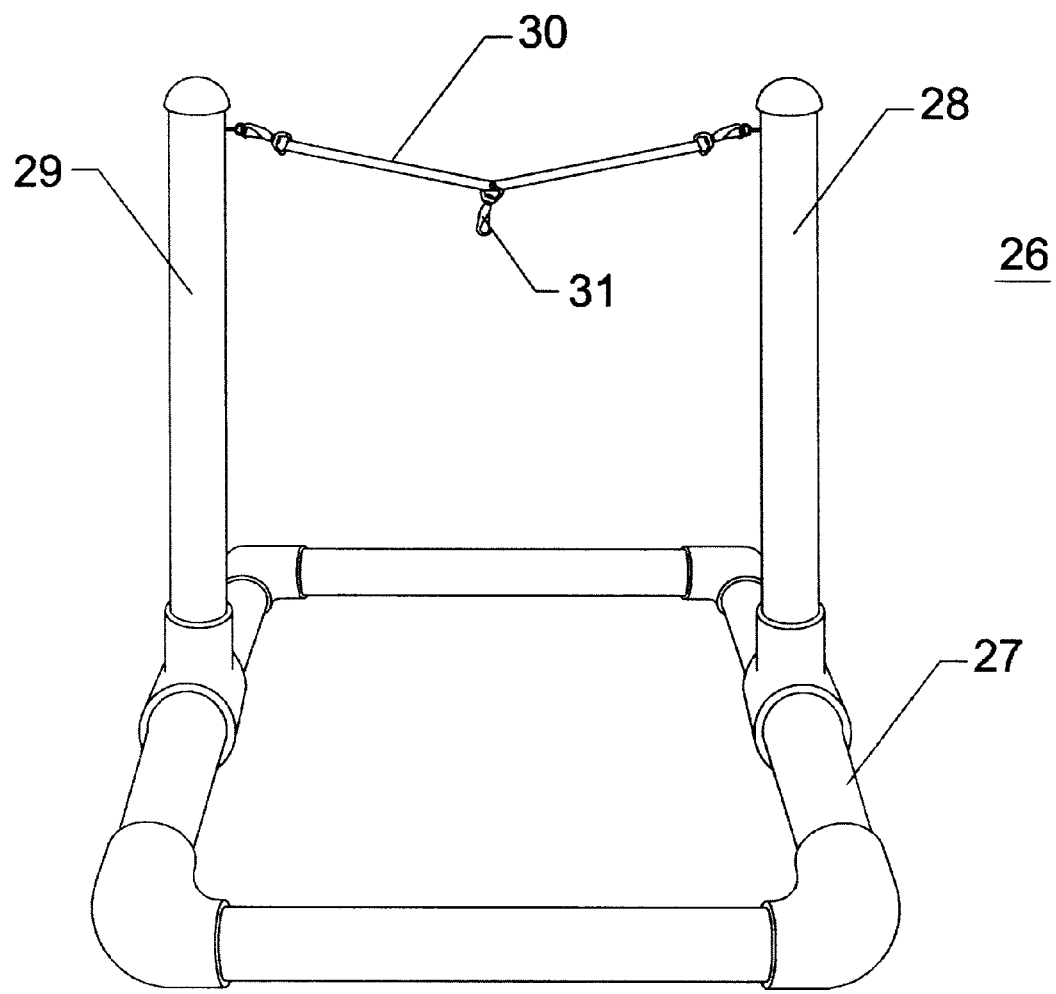
FIG. 6 is an elevated oblique view of a second embodiment of an animal restraining device according to the invention.
Figure 7:
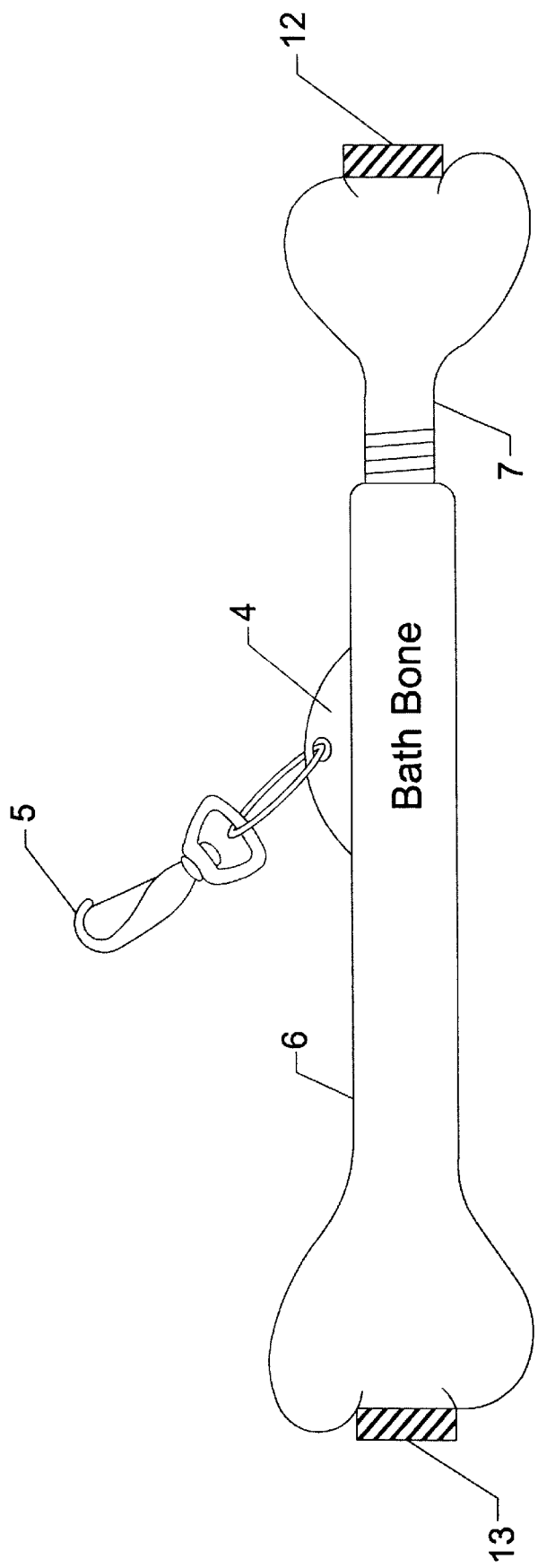
FIG. 7 is an elevated oblique view of an assembled animal restraining device.
Figure 8:
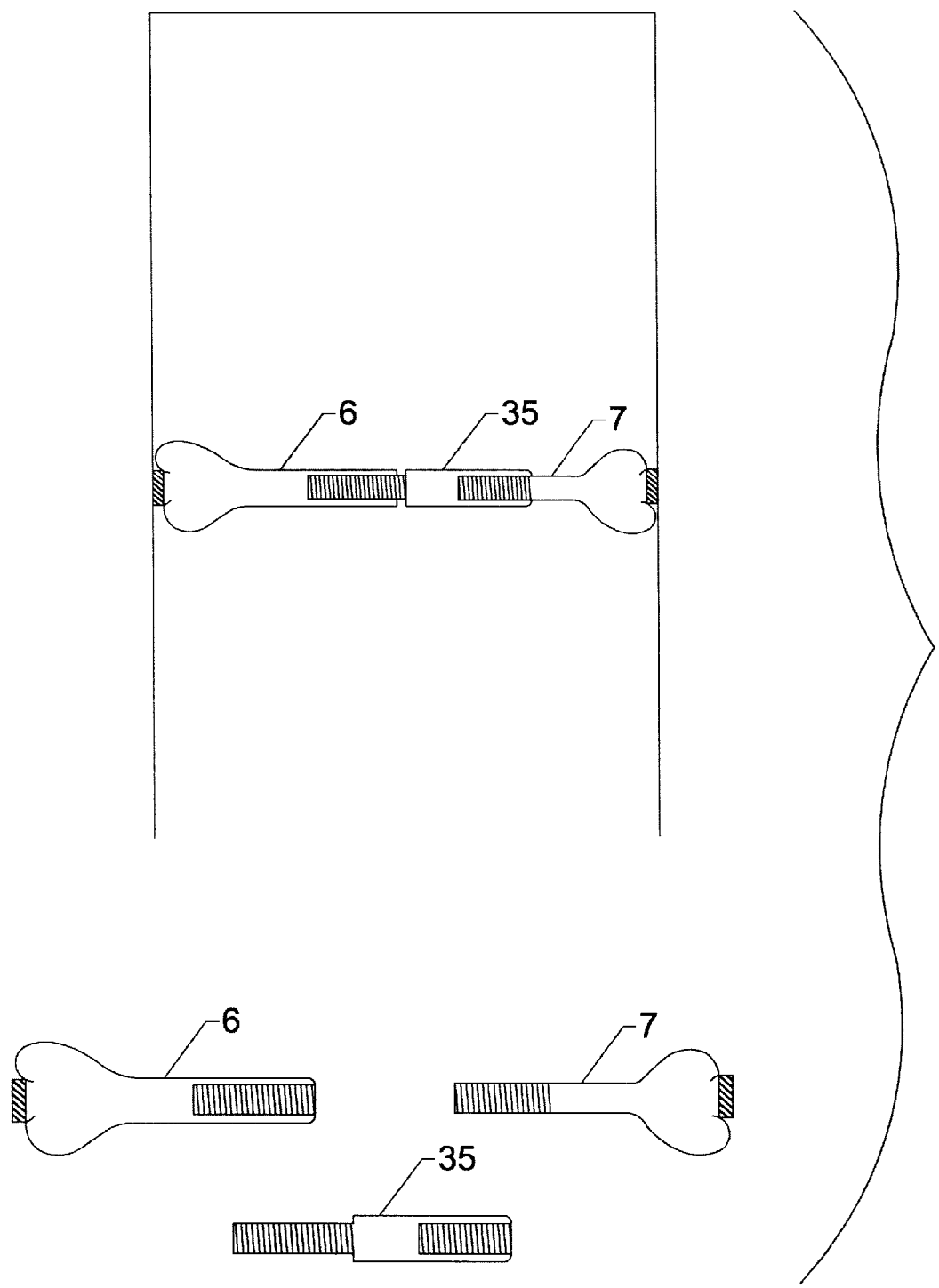
FIG. 8 shows how the animal restraining device can be extended by introducing an extender piece between the two rod pieces.

A further variation of the invention is shown in FIG. 6. There is shown a restraining device 26 for restraining an animal, the device comprising a base 27, two uprights 28, 29 on opposing sides of the base, a flexible restraining crosspiece 30 spanning between the uprights, and an attachment means 31 provided on the crosspiece for attachment to the animal. The device is dimensioned to fit within a bathtub, and the crosspiece can either be constructed so as to be taller than an animal (in which the animal is secured from above) or shorter than the animal (in which case the animal is secured from below). The material of which the device can be constructed is not particularly limited, and it is preferred that the device be constructed of a material which is light weight, durable, water resistant, and inexpensive. The device can be constructed from a polymeric material such as PVC tubing, polyurethane, high density polyethylene, a fiber-reinforced acrylonitrile-butadiene-styrene polymer, nylon, or any other material which is conventionally used in the art.

Using a bathtub as the exemplary installation site, the operation of the animal restraining device of FIG. 6 will now be explained in greater detail. The base 27 of the device is placed into the bathtub such that the two uprights 28, 29 are perpendicular to the floor of the bathtub. An animal is placed into the area defined by the base of the device and latched on to the attachment means 31 provided on the crosspiece 30. In this way, the animal's movement while being bathed will be sufficiently restrained and the mess caused by splashing soap and water will be greatly lessened.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described,

What is claimed is:

1. An animal restraining device for restraining an animal between opposing vertical surfaces, the device comprising an elongate beam for spanning between two generally vertical surfaces, said elongate beam comprising:

a cylindrical housing having first and second ends;

a beam part slidingly guided within said cylindrical housing and having an outward end and an inward end, said outward end provided with a skid resistant material element for frictional engagement with said vertical surface;

length adjustment means for axially displacing said beam part with respect to said cylindrical housing, wherein said length adjustment means includes a lever pivotably secured by means of a pivot pain mounted on said cylindrical housing, and wherein said beam part is connected at its inner end eccentrically to said lever, such that when said lever is in a first position said outer end of said beam part is in a retracted position relative to said cylindrical housing, and when said lever is in a second position said beam part is extended relative to said cylindrical housing;

attachment means for attachment of said animal to said elongate beam, wherein placement of said elongate beam assembly between said opposing vertical surfaces and displacing said outward end of said beam part axially via said length adjustment means results in said skid resistant material being held securely against said vertical surface and said elongate beam assembly remaining in place.

2. An animal restraining device as in claim 1, wherein at least one of said cylindrical housing outer ends has a skid resistant material element rotatably mounted thereon.

3. An animal restraining device as in claim 1, wherein said beam piece is constructed of a polymeric material.

4. An animal restraining device as in claim 3, wherein said polymeric material is plastic.

5. An animal restraining device as in claim 1, wherein said skid resistant material is rubber.

6. An animal restraining device as in claim 1, wherein said attachment means for attachment of said animal includes mounting means including an aperture exterior of said beam assembly and a latching means for latching to said animal, said latching means connected to said mounting means.

7. An animal restraining device as in claim 1, wherein said first and second beam parts together have an outward appearance of a rod, a pillar, a column, or a dog bone.

* * * * *